(12) United States Patent
Brukh

(10) Patent No.: US 12,141,240 B2
(45) Date of Patent: Nov. 12, 2024

(54) METHOD OF CALIBRATION USING MASTER CALIBRATION FUNCTION

(71) Applicant: Rutgers, The State University of New Jersey, New Brunswick, NJ (US)

(72) Inventor: Roman Brukh, Whippany, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 371 days.

(21) Appl. No.: 17/648,505

(22) Filed: Jan. 20, 2022

(65) Prior Publication Data

US 2022/0245408 A1 Aug. 4, 2022

Related U.S. Application Data

(60) Provisional application No. 63/139,413, filed on Jan. 20, 2021.

(51) Int. Cl.
*G06F 18/2451* (2023.01)

(52) U.S. Cl.
CPC ................. *G06F 18/2451* (2023.01)

(58) Field of Classification Search
CPC . G06F 18/2451; G06F 18/213; H01J 49/0009
See application file for complete search history.

(56) References Cited

U.S. PATENT DOCUMENTS

| | | | | |
|---|---|---|---|---|
| 9,043,164 B2 * | 5/2015 | Makarov | ................ | H01J 49/38 |
| | | | | 702/27 |
| 11,854,779 B2 * | 12/2023 | Zhang | ................ | H01J 49/0009 |
| 2005/0023454 A1 * | 2/2005 | Bateman | ............ | H01J 49/0036 |
| | | | | 250/288 |
| 2009/0145779 A1 * | 6/2009 | Wu | ..................... | G01N 27/3273 |
| | | | | 205/792 |
| 2010/0167267 A1 * | 7/2010 | Schulzknappe | .......... | G01N 1/28 |
| | | | | 436/15 |
| 2012/0309027 A1 * | 12/2012 | Anderson | ........... | H01J 49/0036 |
| | | | | 435/7.1 |
| 2018/0053642 A1 * | 2/2018 | Jo | ......................... | G06F 16/355 |
| 2019/0365346 A1 * | 12/2019 | Elliot | ..................... | A61B 6/505 |
| 2021/0225456 A1 * | 7/2021 | Grauman | ............. | C12Q 1/6844 |
| 2021/0265147 A1 * | 8/2021 | Zhang | ................ | H01J 49/0009 |
| 2022/0130494 A1 * | 4/2022 | Woodbury | ............... | G06N 3/08 |
| 2023/0326731 A1 * | 10/2023 | Elia | ...................... | H01J 49/164 |
| | | | | 250/282 |

FOREIGN PATENT DOCUMENTS

WO 03/077914 A1 9/2003

OTHER PUBLICATIONS

Dennis Edgerley: "Techniques for Improving The Accuracy of Calibration in the Environmental Laboratory", WTQA '98—14th Annual Waste Testing & Quality Assurance Symposium, pp. 181-187.

Mitchell, et al: "Enhancing MALDI Time-of-Flight Mass Spectrometer Performance through Spectrum Averaging", PLOS ONE, DOI: 10.1371/journal.pone.0120932, Mar. 23, 2015, pp. 1-15.

Kiang, et al: "An Accurate and Clean Calibration Method for MALDI-MS", Journal of Biomolecular Techniques, 21:116-119, 2010.

* cited by examiner

*Primary Examiner* — Santiago Garcia

(74) *Attorney, Agent, or Firm* — FOX ROTHSCHILD LLP

(57) ABSTRACT

This patent document discloses a method for instrument calibration. In particular, the method can be applied to reduction of random errors by averaging fitting equation coefficients.

20 Claims, 8 Drawing Sheets

METHOD OF CALIBRATION USING MASTER CALIBRATION FUNCTION

FIELD

The present disclosure relates to a method to obtain and validate an instrument calibration. In particular, random errors could be minimized by averaging the fitting equation coefficients. This method could be very useful for modern analytical measurement where high accuracy is desired, for example high resolution mass spectrometers.

BACKGROUND

As instrumental parameters and a sample introduction may fluctuate or drift slightly, it is necessary to perform a calibration of the instrument before measuring the masses of unknown ions. The calibration is done by acquiring signals of known compounds and measuring the instrument's detector response. Then a software uses an approximation method to obtain constants of a calibration equation of a chosen function.

$$m_s = f(r) \quad (1)$$

where $m_s$ is the standard or reference ion mass, and $r$ is the instrument's response.

The obtained calibration equation is used in subsequent measurements to calculate masses of unknown analyte ions from the instrument's response signal, as $$m_i = f(r) \quad (2)$$

where $m_i$ is the mass of measured ion, and $r$ is the instrument's response.

Several different types of calibration functions are used for approximation, linear, quadratic, cubic, logarithmic, exponential, etc. The type of particular calibration function to which an instrument response is approximated depends on various parameters, as instrument geometry, ion pathways, etc. For example, if a quadratic calibration function is used for a MALDI-TOF (matrix assisted laser desorption ionization time of flight) instruments $$m_i = A\tau_i^2 B\tau_i C \quad (3)$$

three constants, A, B and C, must be obtained by a curve fitting method, using standard reference compounds and the detector response, which in this case is an ion arrival time $\tau_i$.

Once the constants of the calibration function (2) are obtained, the instrument is considered to be calibrated, so it is assumed that the function (2) calculates the masses of unknown ions adequately and the masses of ions obtained by the function (2) are accurate.

During measurements, the instrument response for the same mass of ion fluctuates slightly due to various instabilities in the instrument and the measurement process, so only determined from the signal values that deviate within a permitted error from the theoretical mass are accepted. A need exists to develop an efficient approach for instrument calibrations that produces a calibration function generating minimum mass errors.

SUMMARY

This patent document discloses methods and systems meeting the challenges in instrument calibrations. The methods and systems can be applied to the calibrations of modern highly accurate instruments, especially if this method is used for mass calibrations of high resolution mass spectrometers.

An aspect of the patent document provides a method of calibrating an instrument to reduce random errors in determining an attribute of one or more samples. The method includes (i) running a set of reference compounds on the instrument;

(ii) deriving one or more set of one or more constants of one or more calibration function correlating one or more instrument response signals with the attribute of the reference sample;

(iii) repeating steps (i) and (ii) to collect a first plurality sets of the one or more constants until a total number of the first plurality sets equals or exceeds a predetermined number N;

(iv) averaging the respective constants of the first plurality sets of the one or more constants of the calibration function to obtain a first averaged set for determining the attribute of the reference sample;

(v) repeating steps (i)-(ii), closer in time than collection of the first plurality sets prior to examining a first unknown sample, to obtain a second plurality sets of the one or more constants;

(vi) averaging the respective constants of the second plurality sets to obtain a second averaged set;

(vii) determining deviation of the calibration equation having the constants of the second averaged set from the calibration equation having the constants of the first averaged set;

(viii) if the deviation is equal or smaller than a predetermined value, averaging respective constants of the first averaged set and constants of the second averaged set to obtain a first updated set, wherein the attribute of the sample can be determined based on the calibration equation having the constants of the first averaged set, the second averaged set or the first updated set; and optionally (ix) obtaining instrument response signals of the first unknown sample and determining the attribute of the unknown sample.

In some embodiments, the method further includes (x) repeating steps (i)-(ii) to obtain a third plurality sets of the one or more constants of the calibration function or set of calibration functions;

(xi) averaging the respective constants of the third plurality sets to obtain a third averaged set;

(xii) determining deviation of the calibration equation having constants of the third averaged set from the calibration equation having constants of the immediately preceding updated set or the first updated set;

(xiii) if the deviation of step (xii) is equal or smaller than the predetermined value, averaging the respective constants of the third averaged set with its immediately preceding updated set or the first updated set to obtain a second updated set, wherein the attribute of a second unknown sample can be determined based on the third averaged set, its immediately preceding updated set or the second updated set;

(xiv) optionally obtaining instrument response signals of the second unknown and determining the attribute of the second sample, and optionally repeating (x) to (xiii) prior to examination of a subsequent unknown sample.

The attribute can be anything characteristics of a substance, including for example, mass, density, volume, viscosity, wavelength, speed, temperature, power and frequency. In some embodiments, the attribute is mass of the sample.

In some embodiments, the mass and the average of one or more calibration constants are in an equation as follows:

$$m_s = A_{ave}\tau_s^2 + B_{ave}\tau_s + C_{ave}$$

where, $\tau_s$ is sample arrival time, $A_{ave}$, $B_{ave}$, and $C_{ave}$, are averaged values of calibration constants from valid calibrations performed during longtime use of the instrument and calculated as is $$A_{ave} = \frac{\sum_{i=1}^{N} A_i}{N}; \quad B_{ave} = \frac{\sum_{i=1}^{N} B_i}{N}; \quad C_{ave} = \frac{\sum_{i=1}^{N} C_i}{N}$$

In some embodiments, the predetermine number is calculated according to the following equation, $$N \geq \left(\frac{z \times \sigma}{\delta}\right)^2$$

wherein z is z-value corresponding to desired confidence level, $\sigma$ is standard distribution of measurements on a particular instrument, and $\delta$ is an acceptable error.

Another aspect of the patent document provides a system for performing the methods described herein. In some embodiments, the system includes a computer-readable medium coupled to one or more data processing apparatus having instructions stored thereon which, when executed by the one or more data processing apparatus, cause the one or more data processing apparatus to perform a method.

Another aspect provides a method of determining an attribute of a sample. The method includes:
(i) running a set of reference samples on the instrument;
(ii) deriving one or more sets of one or more constants of one or more calibration functions correlating one or more instrument response signals with the attribute of the reference sample;
(iii) repeating steps (i) and (ii) to collect a first plurality sets of the one or more constants until a total number of the first plurality sets equals or exceeds a predetermined number N;
(iv) averaging the respective constants of the first plurality sets of the one or more constants of the one or more calibration functions to obtain a first averaged set for determining the attribute of the reference sample;
(v) repeating steps (i)-(ii), closer in time than collection of the first plurality sets prior to examining a first unknown sample, to obtain a second plurality sets of the one or more constants;
(vi) averaging the second plurality sets to obtain a second averaged set;
(vii) determining deviation of calibration equation having constants of the second averaged set from the calibration equation having constants of the first averaged set;
(viii) if the deviation is equal or smaller than a predetermined value, averaging the respective constants of the first averaged set and the second averaged set to obtain a first updated set, wherein the attribute of the sample can be determined based on the first averaged set, the second averaged set or the first updated set;
(ix) obtaining instrument response signals of the first unknown sample and determining the attribute of the unknown sample.

DETAILED DESCRIPTION OF THE DRAWINGS

DETAILED DESCRIPTION

Various embodiments of this patent document methods and systems for instrument calibrations. The challenges in calibration arise from the high accuracy required for mass calibrations, and the fact that the measurements of masses of the calibration reference standard ions are subjects to the same deviations of instrument response as the measurements of any other ions.

The deviations of reference values may result from but not limited to the sample introduction methods and from data acquisition parameters, as for any other measured ions. In addition, errors of calculated values may also arise from the intrinsic properties of chosen mathematical function, which is used to approximate and curve fit the instrument's response and calculate the subsequent measured values.

It was occasionally observed that even after the careful calibration of a mass spectrometer, measured masses of analyte ions deviate significantly from their expected theoretical masses, so the obtained mass error is well beyond the acceptable value.

Such mass errors might originate in the initial calibration procedure and calibration method acquisition parameters using standard reference ions, and be carried out to calibration function constants and subsequently to all further calculated by that function values.

For example, it is being observed that the instrument response for the same mass of an ion measured by high-end MALDI-TOF MS instrument can fluctuate up to 10 ppm on a relatively well prepared and uniform target sample spot, and the can differ as much as 100 ppm or more on a sample spot with not so uniform matrix-sample morphology.

Figure 1:
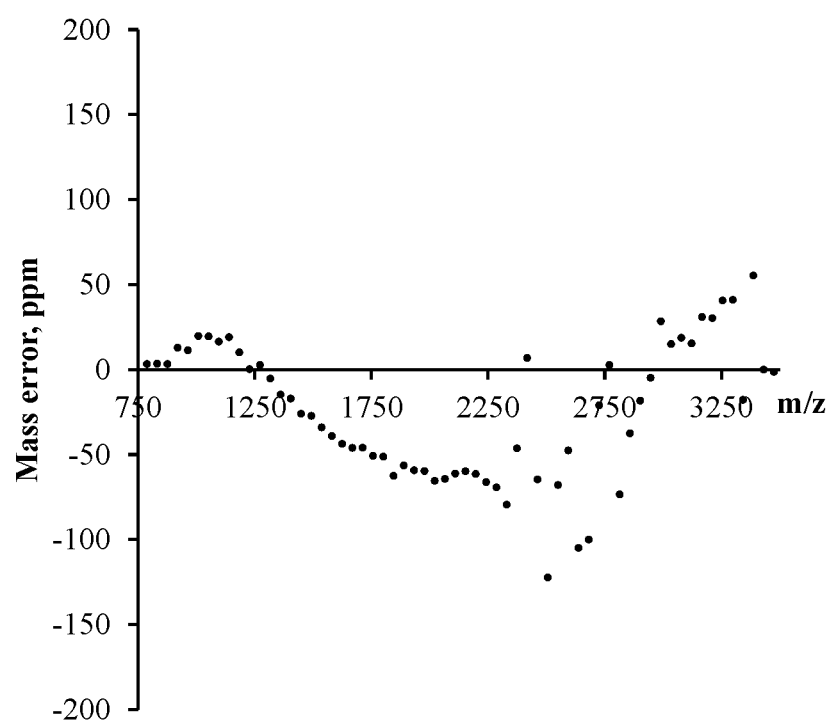
FIG. 1 illustrates deviations of ions masses from the theoretical values in the same spectrum.

The typical errors of masses of different ions obtained in the same spectrum are shown in FIG. 1. As can be seen, the ion masses can deviate in both directions, in positive or negative, and can significantly differ even for nearby ions, as clearly seen in a given spectrum for the ions in the 2300-3000 m/z range. The masses in other mass spectra might show slightly different mass deviations, however, it is apparent that the arrival times of ions fluctuate from spectra to spectra.

The same kind of so-called "normal response signal fluctuations" are also likely when standard reference ions are used to establish calibration function for an instrument. Thus, if the constants of a calibration function, as for example, A, B, and C, for quadratic calibration function (1), are obtained using deviated from theoretical instrument response, this will introduce errors to all subsequently calculated by that equation masses or other values.

Figure 2:
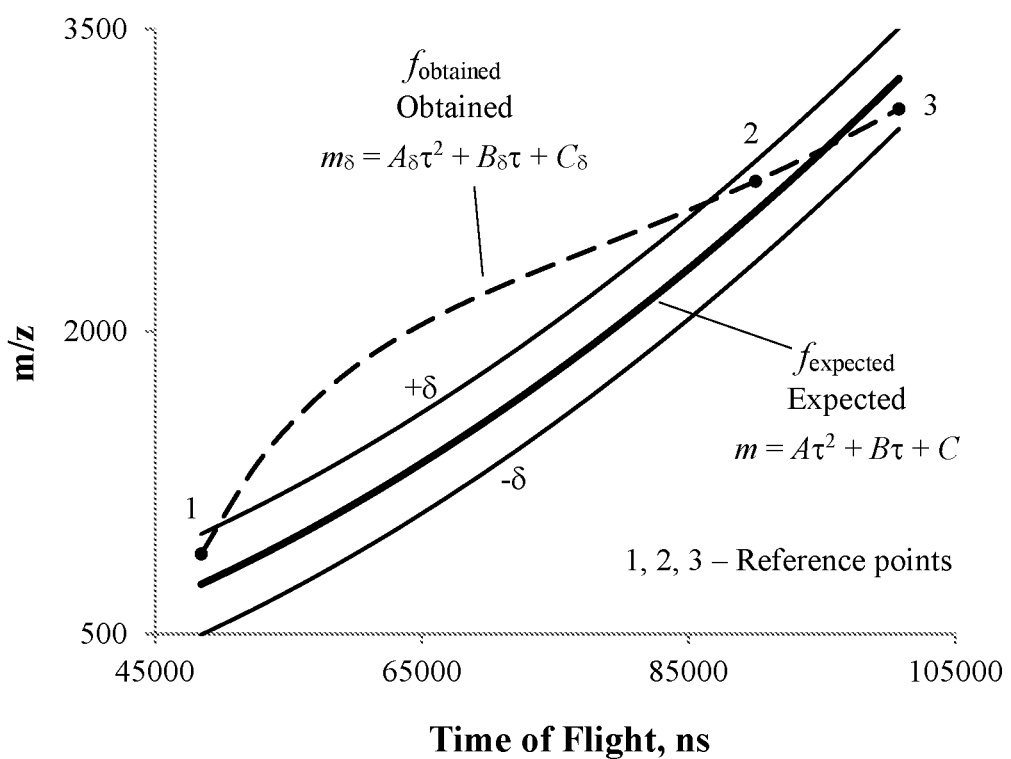
FIG. 2 illustrates errors produced by calibration equation due to natural behavior of mathematical function despite the reference calibration points are within the acceptable error.

The calculated by calibration function higher than acceptable mass errors are also possible even if the instrument response for reference calibration ions are within the acceptable error range to their theoretical/ideal response values. It has been observed that at certain sets of positive or negative deviations of measured reference masses the generated calibration function might produce calculated mass errors of analyte ions that are well beyond the acceptable limit. It is also possible that only a certain range of the calibration function can be used for analyses, as values in outside of that range might produce ion masses well beyond the error limit. The errors produced by the calibration function might be the result of the natural behavior of a chosen mathematical function, as shown in FIG. 2 for quadratic calibration function used to calibrate time-of-flight instruments.

The approach of this patent document is designed to eliminate or minimize the effect of instrument response deviations. It is intended to establish the intrinsic master instrument response function, the major natural response of the particular instrument to the masses of measured ions. As all the measurements are subjects to random errors, the constants of the fundamental intrinsic response master calibration function are obtained by continuously adding and averaging corresponding constants of all valid calibration functions.

An aspect of the patent document provides a method of calibrating an instrument to reduce random errors in determining an attribute of one or more samples. The method generally includes:

(i) running a set of one, two, three, four or more reference samples on the instrument;

(ii) deriving a set of one, two, three, four or more constants of one, two, three, four or more calibration functions correlating one or more instrument response signals with the attribute of the reference sample;

(iii) repeating steps (i) and (ii) to collect a first plurality sets of the one or more constants until a total number of the first plurality sets equals or exceeds a predetermined number N;

(iv) averaging each of the one or more respective constants in the first plurality set to obtain a first averaged set for determining the attribute of the reference samples;

(v) repeating steps (i)-(ii), prior to examining an unknown sample, to obtain a second plurality sets of the one or more constants;

(vi) averaging each of the one or more respective constants in the second plurality set to obtain a second averaged set;

(vii) determining deviation in the attribute calculated from the second averaged set and from the first averaged set;

(viii) if the deviation is equal or smaller than a predetermined value, averaging the respective constants of the first averaged set and the second averaged set to obtain a first updated set;

and optionally (ix) obtaining instrument response signals of the first unknown sample and determining the attribute of the first unknown sample, wherein the attribute of the unknown sample is determined based on the first averaged set, the second averaged set or the first updated set.

In some embodiments, the deviation or maximum error in the attribute is based on the maximum difference calculated by the equation having the first averaged set and the equation having the second averaged set. In some embodiments, the set of samples in step (i) comprises three or more samples. In some embodiments, each calibration function comprises three or more constants.

The method may further include a step to validate the first averaged set. For instance, if the error in the calculated attribute from the first averaged set is bigger than a pre-selected value, then one, two, three or more subsets of the reference samples are selected to derive respectively one, two, three or more sub-sets of constants. These subsets allow a more focused analysis around a range closer to the target attribute. Each subset may be re-run through the instrument to collect the response signals for calculation of the corresponding constants. Alternatively, the response signals from the previous collection can be re-used for the calculation of the corresponding subset of constants. The attribute of an unknown sample falling with a respective subset of the reference samples is calculated based on the constants of the respective subset, and the respective subset substitutes the first averaged step for subsequent steps.

In some embodiments, after step (iv), if the error in the attribute calculated from the first averaged set is bigger than a pre-selected value, two subsets of the reference samples are selected to derive two sub-sets of constants. The two subsets have a partial overlap and are averaged to obtain an averaged subset, and the averaged subset substitutes the first averaged step for subsequent steps with regards to an unknown sample falling with the overlap.

The above step of using targeted subsets (continuous, non-continuous, with or without overlap) can be used independently or in combination. For instance, one can use a first subset out of three continuous subsets for determining the attribute of a sample or setting up a master calibration function equation. In a separate scenario, a subset derived from two overlapping subsets can also be used for the same purposes. Further, the two subsets in the two scenarios can be combined and averaged to obtain a new subset for the above purposes.

In some cases, if after multiple collections the error is greater than the allowed maximum error, the data or reference samples will be divided into subsets or portions as described above so that the constants or calibration equations are more tailored or narrowly adjusted to the range of the actual attribute or the attribute of the sample to be examined.

The methods disclosed herein in various steps may include examining the deviation in attributes between calculated results from a new calibration equation and calculated results from the immediate preceding calibration equation, or between calculated results from a new calibration equation and the actual values of the attributes. A predetermined value ($\delta$ or $\delta_{max}$) as the maximum error or deviation is used for comparison. The value may vary depending on research requirements and the actual attributes (e.g. sizes of ions formed) and range for example from 0.001 to 1000 ppm. Nonlimiting examples of $\delta$ or $\delta_{max}$ include about 0.01 ppm, about 0.1 ppm, about 0.5 ppm, about 1 ppm, about 2 ppm, about 3 ppm, about 4 ppm, about 5 ppm, about 6 ppm, about 8 ppm, about 10 ppm, about 20 ppm, about 30 ppm, about 50 ppm, about 80 ppm, about 100 ppm, about 200 ppm, and about 500 ppm.

A related aspect provides a method to detect an attribute of an unknown sample using the above described method. The attribute may be determined based on the first averaged set, the second averaged set or the first updated set. In some embodiments, the attribute is mass.

A further aspect provides a system comprising a computer-readable medium coupled to one or more data processing apparatus having instructions stored thereon which, when executed by the one or more data processing apparatus, cause the one or more data processing apparatus to perform the methods of calibration or detection disclosed herein. In some embodiments, the system further comprising one or more memories for storing and updating calculation results.

As for example, in case of MALDI-TOF instruments, such master calibration function, which establishes intrinsic, close to theoretical response of an instrument, and calculates the values of ion masses close to their exact masses has a form of quadratic polynomial $$m_i = A_{ave}\tau_i^2 + B_{ave}\tau_i + C_{ave}$$

where, $A_{ave}$, $B_{ave}$, and $C_{ave}$, are averaged values of calibration constants from valid calibrations performed during longtime use of the instrument and calculated as $$A_{ave} = \frac{\sum_{i=1}^{N} A_i}{N}; B_{ave} = \frac{\sum_{i=1}^{N} B_i}{N}; C_{ave} = \frac{\sum_{i=1}^{N} C_i}{N}$$

The greater the number of averaged sets of constants, the lower the error, and the closer are the masses of ions calculated by the fundamental calibration function to the exact masses. The fundamental calibration function is specific to a certain type of instrument and to particular set of method parameters.

The minimum number of averaged sets of constants depends on standard deviation of measurements of a particular instrument as well as desired confidence level, and for example, is determined as $$N \geq \left(\frac{z \times \sigma}{\delta}\right)^2$$

where, z is z-value corresponding to desired confidence level, $\sigma$ is standard distribution of measurements on a particular instrument, $\delta$ is an acceptable error.

In an exemplary embodiment, a method of instrument calibration includes the following:

1. Performing of initial calibration of an instrument, which is obtaining the constants of the initial calibration function that returns the masses of standard reference ions, $m_s$, from the instrument response, r, as $$m_s = f(r)$$

2. When subsequent calibrations are performed, the constants of their calibration functions are added to the corresponding constants of the previously obtained calibration functions and the averaged constants of calibration function are calculated; these averaged constants constitute the constants of master calibration function;

3. The master calibration function is considered complete when the number of averaged sets of constants of a calibration function is equal or greater than the minimum number of sets for a chosen confidence level, which can for example be determined as $$N \geq \left(\frac{z \times \sigma}{\delta}\right)^2$$

where, z is z-value corresponding to desired confidence level, $\sigma$ is standard deviation of measurements on a particular instrument, and $\delta$ is an acceptable error.

4. Once the complete master calibration function is obtained, all subsequent newly obtained calibration functions should be validated against the master calibration function, by calculating the deviations between the attribute value calculated by newly obtained calibration function and the attribute value calculated by the master calibration function and comparing these deviations/errors with the accepted deviation/error;

5. Only those calibration functions, whose deviation/error on entire calibration range is smaller than the acceptable values are considered to be valid and can be used to return the masses of ions from the instrument response;

6. The constants or coefficients of the newly obtained valid calibration function are averaged with the corresponding constants or coefficients of the master calibration function to provide new updated constants or coefficients of calibration function; the updated set of calibration function can subsequently be used for validation of new calibration functions.

The subsequent new set or sets of constants are evaluated against the immediately preceding updated set of constants. If the deviation is within a predetermined range, the new set is averaged with the immediately preceding updated set of constants to provide a new updated set. The new updated set will be the immediately preceding updated for subsequently collected of new set or sets of constants for evaluation of deviation. The cycle of continuously updating the immediately preceding update with a reference sample prior to the examination of the unknown sample will help reduce random errors in determining an attribute of the sample. The reference sample has known attributes for collection of constants of calibration function. A reference sample can be the same or different from a subsequent reference sample used for data collection.

Various instruments might use different mathematical functions to relate an instrument response signal to an attribute of the sample. Non-limiting examples of these functions and examples of their applications include:

| Function | Description |
|---|---|
| $m_i = Ax^3 + Bx^2 + Cx + D$ | cubic calibration function, where $m_i$ is the mass of an ion, x is the instrument response (time, frequency, radius, etc.), A, B, C, D, are the constants of the calibration function |
| $m_i = A\tau_i^2 + B\tau_i + C$ | quadratic calibration function used for example for TOF analyzers, where $m_i$ is the mass of an ion, $\tau_i$ is the arrival time of an ion, A, B, C, are the constants of the calibration function, or |
| $m_i = Ax^2 + Bx + C$ | quadratic calibration function, where $m_i$ is the mass of an ion, x is the instrument response (time, frequency, radius, etc.), A, B, C, are the constants of the calibration function |
| $m_i = Ax + B$ | linear calibration function, where $m_i$ is the mass of an ion, x is the instrument response (time, frequency, radius, etc.), A, B, are the constants of the calibration function |
| $\frac{m_i}{z} = \frac{A}{\vartheta^3} + \frac{B}{\vartheta^2}$ | function used for example for Orbitrap analyzers, where $m_i$ is the mass of an ion, z is the charge of the ion, $\vartheta$ is the instrument response (time, frequency, radius, etc.), A, B, are the constants of the calibration function |
| $\frac{m_i}{z} = \frac{A}{\vartheta^3} + \frac{B}{\vartheta}$ | function used for example for FTMS analyzers, where $m_i$ is the mass of an ion, z is the charge of the ion, $\vartheta$ is the instrument response (time, frequency, radius, etc.), A, B, are the constants of the calibration function |

| | |
|---|---|
| $\dfrac{m_i}{z} = \dfrac{A}{\vartheta}$ | function used for example for Orbitrap and FTMS analyzers, where $m_i$ is the mass of an ion, z is the charge of the ion, $\vartheta$ is the instrument response (time, frequency, radius, etc.), A is the constant of the calibration function |
| $\dfrac{m_i}{z} = A\dfrac{B^2}{U}$ | function used for example for magnetic sector instruments, where $m_i$ is the mass of an ion, z is the charge of the ion, B is the magnetic field, U is the voltage, A is the constant of the calibration function |
| $m_s = Ar^B$ | exponential function, where 'r' is the detector response, A, B are the constant of the calibration function |

Other mathematical functions that are not shown above are also used as calibration functions to relate an instrument response to the sample attribute.

For the functions shown above or other functions to which instrument response is approximated, constants, such as A, B, C, D, etc., must be obtained by a curve fitting method, using standard reference compounds and the instrument detector response, which could be but not limited to an ion arrival time, frequency, ion radius path, voltage, magnetic field, and any other characteristic parameter of an ion detected or applied to an ion by the instrument.

Once the constants, such as A, B, C, D, etc., of the calibration function are obtained, the instrument is considered to be calibrated, so it is assumed that the function calculates the masses of unknown ions adequately and the masses of ions obtained by the calibration function (2) are accurate.

In an exemplary embodiment, a method for calibrating an instrument and/or determining an attribute of a sample includes one or more of the following steps:

(a) running an experiment on the instrument using standard samples and collecting the detector response. This step includes deriving a set of one, two, three, four, five, six or more constants of calibration function, $A_1$, $B_1$, $C_1$, $D_1$, etc., correlating with the attribute of the sample. In some embodiments, multiple experiments are performed on the instrument using standard or reference samples and collecting corresponding detector responses until the number of experiments is equal or exceeds a predetermined number, N. A total of N or more sets of one or more constants of calibration function correlating with the attribute of the sample are obtained, as $A_1$, $B_1$, $C_1$, $D_1$, . . . .
$A_2$, $B_2$, $C_2$, $D_2$, . . . .
. . . .
$A_N$, $B_N$, $C_N$, $D_N$, . . . .

(b) calculating out a first average set or master set of one or more averaged respective/corresponding constants of calibration function, as $$A_{ave} = \frac{\sum_{i=1}^{N} A_i}{N}; B_{ave} = \frac{\sum_{i=1}^{N} B_i}{N}; C_{ave} = \frac{\sum_{i=1}^{N} C_i}{N}; D_{ave} = \frac{\sum_{i=1}^{N} D_i}{N}; \ldots$$

The predetermined number "N" can be calculated according to the following equation, wherein z is z-value corresponding to desired confidence level, $\sigma$ is standard deviation of measurements on a particular instrument, and $\delta$ is an acceptable error.

$$N \geq \left(\frac{z \times \sigma}{\delta}\right)^2$$

The standard deviation, $\sigma$, can be calculated for example as $$\sigma = \sqrt{\frac{\sum_{i=1}^{N}(m_i - m_{ave})^2}{N}} \text{; or } \sigma = \sqrt{\frac{\sum_{i=1}^{N}(m_i - m_{ave})^2}{N-1}}$$

where $\sigma$ is a standard deviation, $m_i$ is the value of a measurement, $m_{ave}$, is the average value of N measurements. The calibration function having constants $A_{ave}$, $B_{ave}$, $C_{ave}$, $D_{ave}$, etc., is a master calibration function and will be used for further measurements.

(c) determining the deviation. This step involves running a set of reference or standard samples on an instrument as in step (a). A new set (second average set) of one or more constants of calibration function is derived including, $A_{new}$, $B_{new}$, $C_{new}$, $D_{new}$, etc., correlating with the attribute of the sample. Multiple sets of data can be similarly collected and averaged.

(d) determining the deviation. The deviation of the new calibration function having set of new constants, $A_{new}$, $B_{new}$, $C_{new}$, $D_{new}$, etc, from the function having set of averaged constants, $A_{ave}$, $B_{ave}$, $C_{ave}$, $D_{ave}$, etc., or its immediate preceding average is determined in this step. Alternatively, the deviation of attribute of the sample can be calculated by calibration function having coefficients $A_{new}$, $B_{new}$, $C_{new}$, $D_{new}$, etc. and by calibration function having coefficients $A_{ave}$, $B_{ave}$, $C_{ave}$, $D_{ave}$, etc. The deviation is determined as for example using attribute calculated from the new function (second average set) and master function (first average set)

$$\delta = \frac{\text{attribute calculated by new function} - \text{attribute calculated by master function}}{\text{attribute calculated by master function}}$$

(e) applying the calibration function. The calibration function having constants $A_{new}$, $B_{new}$, $C_{new}$, $D_{new}$, etc, is applied to determine the attribute of the sample if the deviation is within a predetermined acceptable error $\delta < \delta_{max}$. $\delta_{max}$ is an acceptable error and non-limiting examples of its value include 1, 2, 3, 5, 10, 15, 20, 50, 100, 200, 500, or 1000 ppm. The attribute of the sample can also be determined by applying the calibration function having constants $A_{ave}$, $B_{ave}$, $C_{ave}$, $D_{ave}$, etc. If $\delta > \delta_{max}$, the above steps can be repeated until it is within an acceptable range.

(f) updating the calibration constant. The new set of constants, $A_{new}$, $B_{new}$, $C_{new}$, $D_{new}$ etc is averaged with the corresponding averaged constants, $A_{ave}$, $B_{ave}$, $C_{ave}$, $D_{ave}$, etc, or constants from the immediately preceding updated set of constants to obtain a new updated set of averaged constants if the deviation is within a predetermined value, as $$A_{updated\ ave} = \frac{nA_{ave} + A_{new}}{n+1};$$

$$B_{updated\ ave} = \frac{nB_{ave} + B_{new}}{n+1}; \ldots \text{etc.}$$

n is the number of sets included to calculate $A_{ave}$, $B_{ave}$, $C_{ave}$, $D_{ave}$, etc.

The attribute of a sample can be determined by applying the calibration function having constants $A_{updated\ ave}$, $B_{updated\ ave}$, $C_{updated\ ave}$, $D_{updated\ ave}$, etc.

Alternatively, one or more of the above steps (e.g. (a) and (b) can be repeated to collect a plurality sets of the one or more calibration constants until a total number of the plurality sets equals or exceeds a predetermined number, as $A_{new\ 1}$, $B_{new\ 1}$, $C_{new\ 1}$, $D_{new\ 1}$, ....
$A_{new\ 2}$, $B_{new\ 2}$, $C_{new\ 2}$, $D_{new\ 2}$, ....
....
$A_{new\ n}$, $B_{new\ n}$, $C_{new\ n}$, $D_{new\ n}$, ....

A set of averaged corresponding new constants, $A_{new\ ave}$, $B_{new\ ave}$, $C_{new\ ave}$, $D_{new\ ave}$, etc., of the plurality sets of the one or more calibration constants is obtained for determining the attribute of the sample. The deviation of the set of averaged new constants, $A_{new\ ave}$, $B_{new\ ave}$, $C_{new\ ave}$, $D_{new\ ave}$, etc. can be calculated from the set of averaged constants, $A_{ave}$, $B_{ave}$, $C_{ave}$, $D_{ave}$, etc, or its immediate preceding average.

(g) determining an attribute of a sample. If the deviation is within an acceptable range, the new average set can be applied to the determination of an attribute of a sample. Alternatively, the new set of averaged constants, $A_{new\ ave}$, $B_{new\ ave}$, $C_{new\ ave}$, $D_{new\ ave}$, etc can be averaged with the corresponding averaged constants, $A_{ave}$, $B_{ave}$, $C_{ave}$, $D_{ave}$, etc, or constants from the immediately preceding updated set of constants to obtain a newer updated set of averaged constants for determining the attribute of a sample. Further, the newer updated set can be stored in a memory for calculation of a deviation of a future data set.

In some embodiments, the calculation of the deviation is based on the one or more constants of the reference sample. Various equations are known in the field to carry out the determination. In an exemplary embodiment, the following equation is adopted.

$$\delta = f_{new}(r) - f_{previous/updated}(r)$$

$f_{new}(r)$ is a new calibration function;
$f_{previous/updated}(r)$ is a previous or updated master function.

In some embodiments, the method includes removing one or more sets of constants that are outside the range of a predetermined deviation threshold. Non-limiting examples of the threshold value include those illustrated above. A new average is then calculated based on the remaining sets of constants. In some embodiments, the total number of the remaining sets is equal of more than the predetermined number as defined above. In some embodiments, one or more sets of data from a selective date(s) are removed to calculate a new average, and the total number of the remaining sets is preferably equal of more than the predetermined number.

In some embodiments the range of interest is divided into multiple partial ranges described by multiple calibration functions which are obtained using described above procedure.

EXAMPLES

The following example illustrates the use of the Method for the calibration of a time of flight (TOF) mass spectrometer using quadratic calibration function. The method can also be used for calibration of other types of instruments using other than quadratic mathematical functions. The calibration can be performed by a software, which is a separate installation or a part of a software used to run the instrument.

(1) Select a set, of n (e.g. 1, 2, 3, 4, 5, 6, or higher number) reference compounds having close masses), $m_1$, $m_2$, $m_n$, that cover the entire mass range of interest;

(2) Run the set of the reference compounds and determine the standard deviation, $\sigma_n$, of the instruments response signal, ion arrival time, $\tau_n$, for each reference compound, 1 ... n, as $$\sigma_N = \sqrt{\frac{\sum_{i=1}^{p}(\tau_{ni} - \tau_{nave})^2}{p}};$$

where $\sigma_n$ is the standard deviation of the $n^{th}$ reference compound; p is the number of initial runs (e.g. 2, 3, 4, 5, 6, 7, 8, 9, 10, or a higher number) of the set of reference compounds; $\tau_{ni}$ is the $i^{th}$ arrival time of $n^{th}$ ion in an initial set of p arrival times; $\tau_{nave}$ is the average arrival time of $n^{th}$ ion $$\tau_{nave} = \frac{\sum_{i=1}^{p} \tau_{ni}}{p}$$

Figure 3:
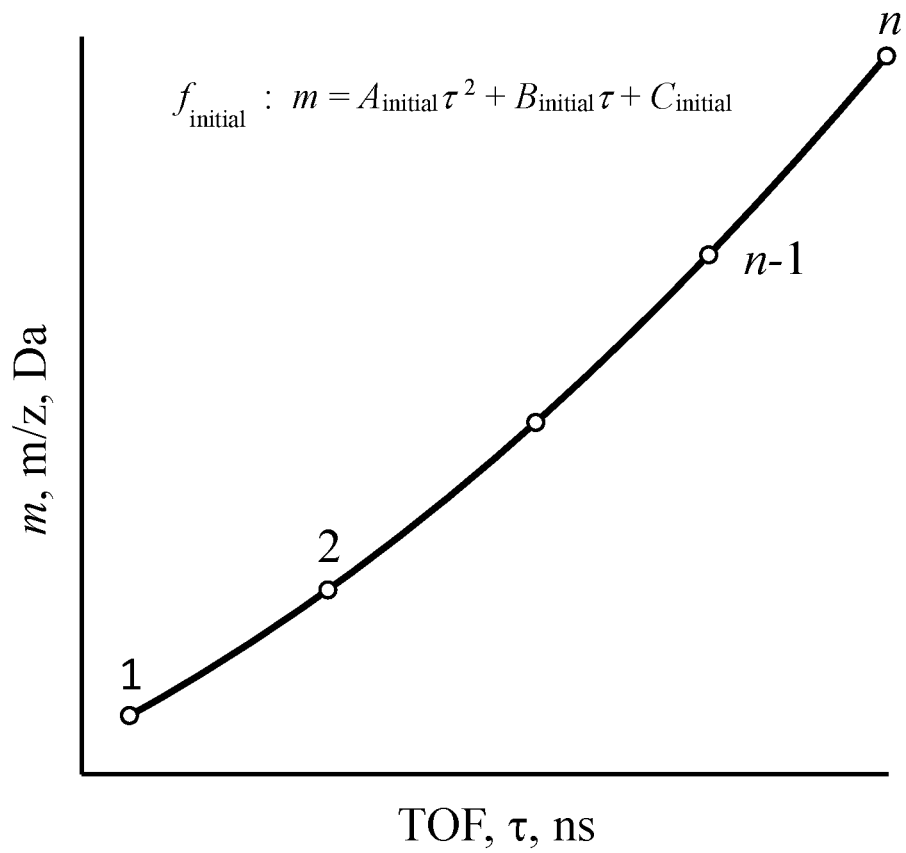
FIG. 3 illustrates a full range calibration function covering all reference samples.

(3) Determine the minimum number, $N_i$, i=1, ..., n, of instrument responses (ion arrival times in nanoseconds) to be collected for each reference compound, n, for a selected confidence level, to obtain a set of minimum numbers of instrument responses for each reference ion, as $N_1$, $N_2$, ..., $N_n$, $$N_n \geq \left(\frac{z \times \sigma_n}{\delta}\right)^2$$

where z is z-value corresponding to desired confidence level (for example, z=1.65, for 90% confidence level; z=1.96, for 95% confidence level; z=2.576, for 99% confidence level; z=3.291, for 99.9% confidence level); $\sigma_n$ is the standard deviation of arrival times for the corresponding compound, n; $\delta$ is a predetermined acceptable error, for example, for publications in major research journals $\delta$ should not exceed 5 ppm, in other chemical, biochemical etc. research the acceptable error might vary from 0.001 to 100 ppm or higher, which depends on the sizes of an ions and fragments formed;

(4) Collect at least N sets of instrument responses, such as arrival times for each reference ion, where N is equal to a maximum number from the set $N_1$, $N_2$, ..., $N_n$, determined in step (3), to obtain a set of arrival times, $\tau_{(j)1}$, $\tau_{(j)2}$, ..., $\tau_{(j)N}$, for each reference ion j, j=1, ..., n;

(5) Calculate the average instrument response, such as arrival time for each reference ion, n, as $$\tau_{n\ ave} = \frac{\sum_{i=1}^{N} \tau_{(n)i}}{N}$$

where $\tau_{ni}$ is the $i^{th}$ arrival time of $n^{th}$ ion in the set of N arrival times, i=1, ... N;

(6) using an approximation method, obtain coefficients, $A_{initial}$, $B_{initial}$, and $C_{initial}$, for the initial quadratic calibration function $$m = A_{initial}\tau^2 + B_{initial}\tau + C_{initial} \quad (f_{initial})$$

which relates the arrival time of an ion, $\tau$, to its mass, m, FIG. 3;

For this purpose, the least square approximation method can be used as $$\begin{bmatrix} n & \sum_{i=1}^{n}\tau_{i\,ave} & \sum_{i=1}^{n}\tau_{i\,ave}^2 \\ \sum_{i=1}^{n}\tau_{i\,ave} & \sum_{i=1}^{n}\tau_{i\,ave}^2 & \sum_{i=1}^{n}\tau_{i\,ave}^3 \\ \sum_{i=1}^{n}\tau_{i\,ave}^2 & \sum_{i=1}^{n}\tau_{i\,ave}^3 & \sum_{i=1}^{n}\tau_{i\,ave}^4 \end{bmatrix} \times \begin{bmatrix} C_{initial} \\ B_{initial} \\ A_{initial} \end{bmatrix} = \begin{bmatrix} \sum_{i=1}^{n}m_{i\,exact} \\ \sum_{i=1}^{n}\tau_{i\,ave}m_{i\,exact} \\ \sum_{i=1}^{n}\tau_{i\,ave}^2 m_{i\,exact} \end{bmatrix}$$

where $\tau_{i\,ave}$ is the average arrival time of the $i^{th}$ ion, calculated in step (5); $m_{i\,exact}$ is the exact mass of the $i^{th}$ ion in Daltons; $i=1, \ldots, n$, where n is the total number of reference ions;

(7) Substitute the average arrival times, $\tau_{1\,ave}$, $\tau_{2\,ave}$, ..., $\tau_{n\,ave}$, determined in step (5), into the initial quadratic calibration function ($f_{initial}$) obtained in step (6) to obtain calculated masses of the reference ions, $m_{1c}, m_{2c}, m_{3c}, \ldots, m_{nc}$, as $$m_{1c} = A_{initial}\tau_{1ave}^2 + B_{initial}\tau_{1ave} + C_{initial}$$

$$m_{2c} = A_{initial}\tau_{2ave}^2 + B_{initial}\tau_{2ave} + C_{initial}$$

...

$$m_{nc} = A_{initial}\tau_{nave}^2 + B_{initial}\tau_{nave} + C_{initial}$$

Figure 4:
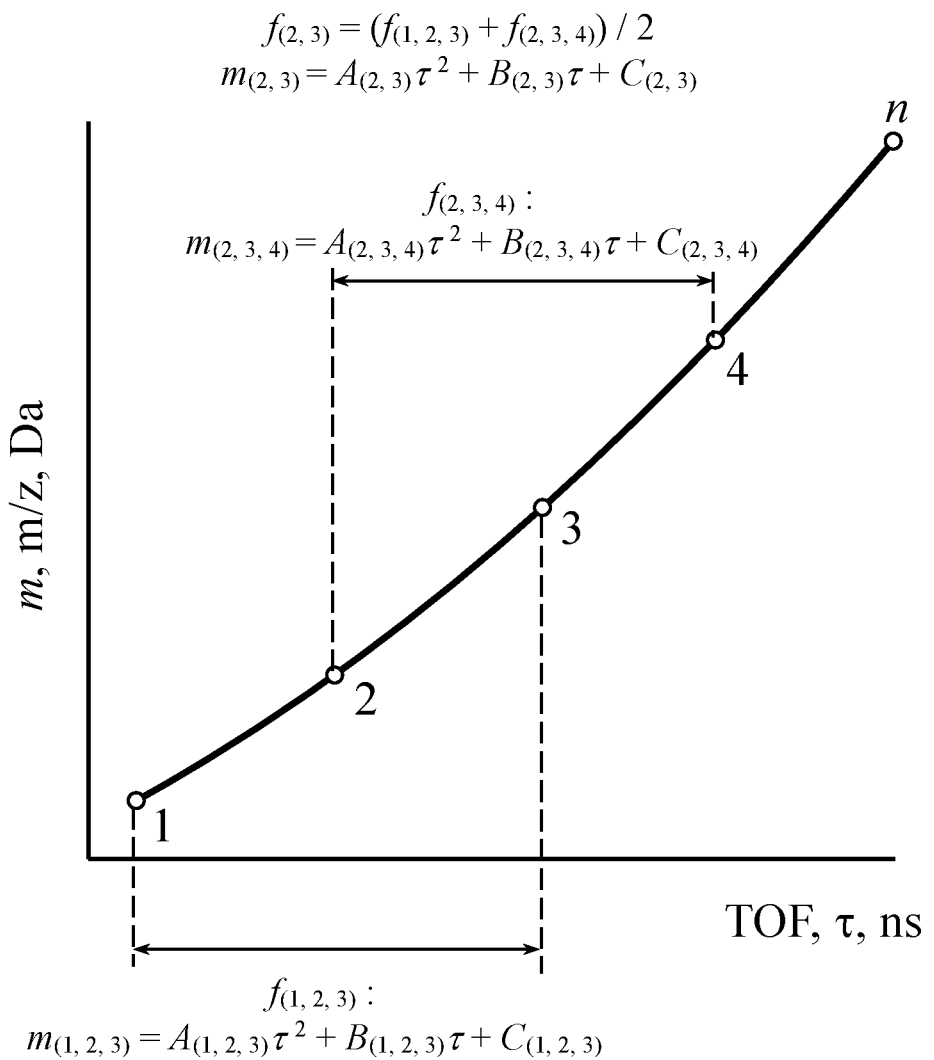
FIG. 4 illustrates a set of partial calibration functions covering the mass range of interest.
Figure 5:
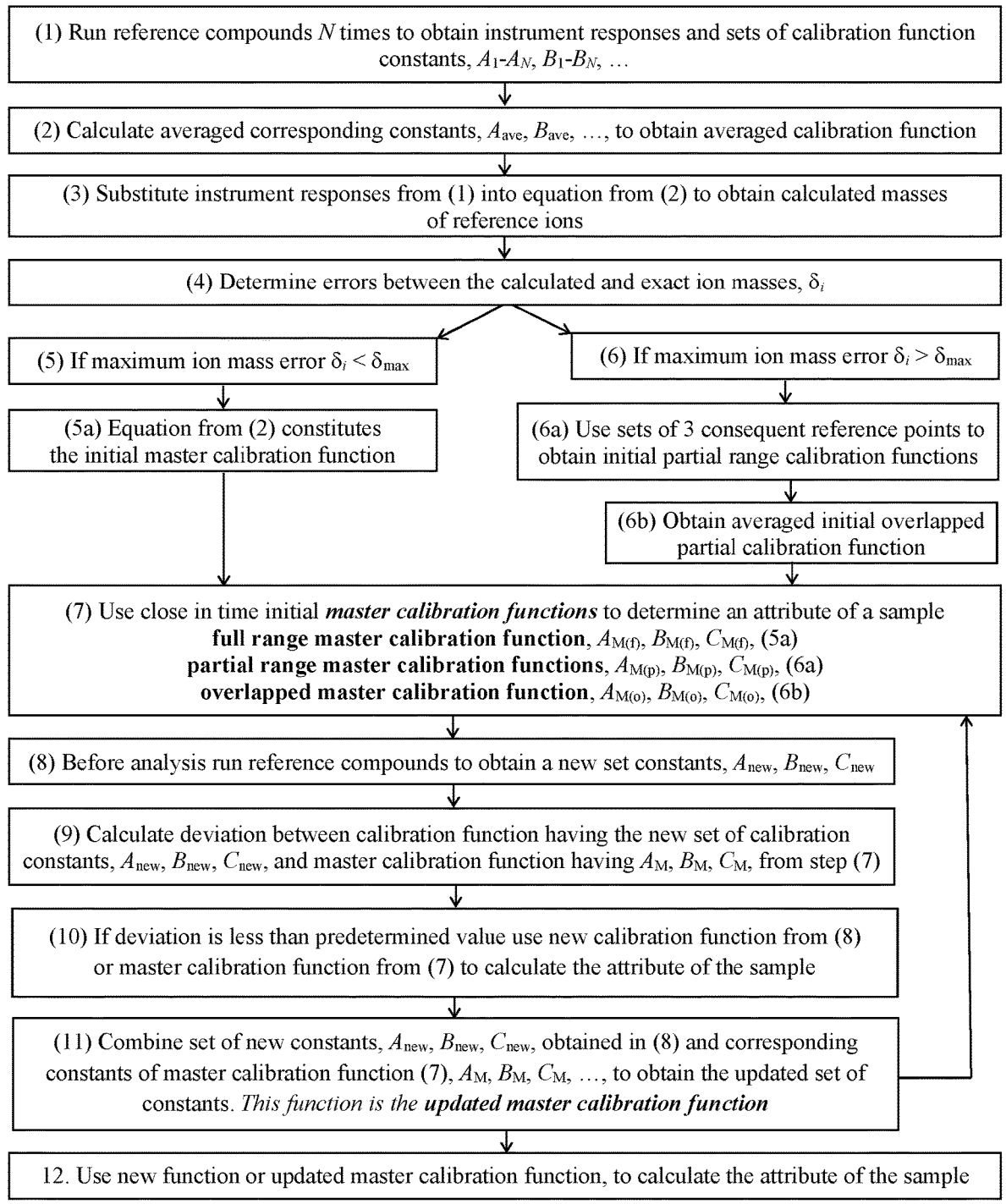
FIG. 5 illustrates an exemplary process to obtain calibration function constants and calculate the attribute of a sample.

(8) Calculate the mass errors generated by the initial quadratic equation ($f_{initial}$) for all n reference ions, as $$\delta_i = \frac{(m_{ic} - m_{i\,exact})}{m_{i\,exact}} \times 10^6 \quad i = 1, \ldots, n \text{ (ppm)}$$

where $m_{ic}$ is the calculated from ($f_{initial}$) mass of $i^{th}$ reference ion, $i=1, \ldots, n$, obtained in step (7); $m_{i\,exact}$ is the exact mass of corresponding reference ion;

(9) Compare the mass errors, $\delta_i$, of each reference compound, obtained in step (8), to a predetermined maximum acceptable value, $\delta_{max}$;

(10) If the generated by the initial calibration equation ($f_{initial}$) mass error, $\delta_i$, of an ion does not exceed a predetermined maximum acceptable mass error value, $\delta_i \leq \delta_{max}$, the calibration equation is considered valid and can be used to determine the attribute of an unknown sample, such as the mass of an ion;

(11) If the generated by the calibration equation mass error of an ion exceeds a predetermined maximum acceptable mass error, $\delta_i > \delta_{max}$, ($\delta_{max}$ is determined by research requirements and might depend on sizes of ions formed, for example, $\delta_{max}$ can range from 0.001 to 1000 ppm or even more) then (a) obtain a set of three-points partial range calibration equations using sets of three closely adjacent reference compounds, as shown in FIG. 4, as $$f_{(1,2,3)}: m_{(1-3)} = A_{(1-3)}\tau^2 + B_{(1-3)}\tau + C_{(1-3)} (f_{1-3}) \text{ covers range from 1 to 3}$$

$$f_{(2,3,4)}: m_{(2-4)} = A_{(2-4)}\tau^2 + B_{(2-4)}\tau + C_{(2-4)} (f_{2-4}) \text{ covers range from 2 to 4}$$

$$f_{(3,4,5)}: m_{(3-5)} = A_{(3-5)}\tau^2 + B_{(3-5)}\tau + C_{(3-5)} (f_{3-5}) \text{ covers range from 3 to 5}$$

....

The masses of compounds to be analyzed should not be lower than the lowest mass reference compound and should not be higher than the highest mass reference compound within the sets of three reference compounds used to generate the partial range calibration equation. Use a partial range calibration equation, such as ($f_{1-3}$) or ($f_{2-4}$), or etc., to analyze ions having masses between the lowest and highest mass reference compounds used to generate the partial range calibration equation;

or (b) use two adjacent tree-points partial range calibration equations found in step (11)(a) to obtain the averaged partially overlapped quadratic calibration equation, in which first partial range calibration equation is shifted relatively to the second partial range calibration equation by one reference point. As show in FIG. 4, the equation $f_{(1-2-3)}$ is approximated using points 1, 2, and 3, and equation $f_{(2-3-4)}$ is approximated using points 2, 3, and 4. The equation $f_{(2-3-4)}$ is shifted relatively to the equation $f_{(1-2-3)}$ by one point; these two equations overlap in the range between 2 and 3.

The averaged overlapping calibration equation $f_{(2-3)}$ is obtained by calculating averages of corresponding coefficients of two contributing partial calibration equations, as $$A_{(2,3)} = \frac{A_{(1,2,3)} + A_{(2,3,4)}}{2};$$

$$B_{(2,3)} = \frac{B_{(1,2,3)} + B_{(2,3,4)}}{2};$$

$$C_{(2,3)} = \frac{C_{(1,2,3)} + C_{(2,3,4)}}{2};$$

Use the obtained averaged overlapping calibration equation to analyze compounds, which have masses in the overlapping range, such as between 2 and 3;

(12) the calibration equations obtained in steps (10), (11)(a), (11)(b) reflect the intrinsic instrument response and constitute the set of master calibration functions, which are stored within the instrument method parameters.

Master Calibration Process (1) run regular, comprehensive or non-comprehensive set of calibration reference compounds and collect a set of new instrument response signals;

(2) based on the mass range of interest and the saved set of intrinsic instrument response functions, determine the proper calibration equation to be used for analyses;

(3) calculate new constants, $A_{new}$, $B_{new}$, $C_{new}$, for a new calibration equation;

(4) the new calibration equation is validated to ensure that the generated maximum mass errors do not exceed the allowed maximum mass error. The maximum mass error, which is calculated as the maximum difference between values of the instrument intrinsic master calibration function that is described by quadratic polynomial $$m_{master} = A_{master}\tau^2 + B_{master}\tau + C_{master} \quad (f_{master})$$

and new calibration function described by quadratic polynomial $$m_{new} = A_{new}\tau^2 + B_{new}\tau + C_{new} \quad (f_{new})$$

occurs at instrument response signal $$\tau_{\delta max} = \frac{(B_{master} - B_{new})}{2(A_{new} - A_{master})}$$

and is obtained as $$\delta_{max} = \frac{(f_{new}(\tau_{\delta max}) - f_{master}(\tau_{\delta max}))}{f_{master}(\tau_{\delta max})} \times 10^6 \text{ (ppm)}$$

where $f_{new}(\tau_{\delta\ max})$ and $f_{master}(\tau_{\delta\ max})$ are values of the new and master calibration functions calculated at point $\tau_{\delta\ max}$.

(5) if the new calibration function is found to be valid, compounds are analyzed, and the constants of the new valid calibration function, $A_{new}$, $B_{new}$, $C_{new}$, are averaged with the initial Master Calibration Constants $A_{master}$, $B_{master}$, $C_{master}$; the set of the Master Constants is updated;

(6) each time a calibration is performed and constants are validated, they are averaged with the Master Calibration Constants to obtain the updated Master Calibration function;

(7) the maximum number of averaged Master Calibration Constants can be specified, for example 10, 20, 50, 100, 1000 ppm, or other number;

(8) the full calibration range can be described by a single calibration function or by several partial calibration functions, or by several overlapping partial calibration functions;

(9) An attribute of a sample can be obtained using the new calibration function, the master calibration function, or the updated master calibration function;

The proposed method of Master Calibration Function is illustrated using a MALDI-TOF (matrix assisted laser desorption ionization time of flight) mass spectrometer using quadratic calibration function. The method can also be used for calibration of other types of instruments using other than quadratic mathematical functions. The calibration can be performed by a software, which is a separate installation or a part of a software used to run the instrument.

(1) A polyethylene glycol (PEG) was used to produce a spectrum in the range from 745 to 3520 m/z. The spectrum contained 64 PEG ions with Na adduct. As a matrix α-cyano-4-hydroxycinnamic acid was used. Each spectrum was achieved by 1000 laser shots;

(2) In order to determine the standard deviation of instrument responses, τ, (arrival times of ions), 25 initial spectra were collected, p=25, where p is the number of initial spectra; this resulted in 25 arrival times (p=25) for each of 64 ions.

The typical distribution of arrival times, for example, for PEG ion of 745.419221 m/z in the collected spectra and the average ion arrival time are shown below $$\tau_{nave} = \frac{\sum_{i=1}^{p} \tau_{ni}}{p} \quad p = 25$$

$\tau_1$=48535.114058; $\tau_2$=48535.216295; $\tau_3$=48535.036015; . . . ; $\tau_{25}$=48535.157462;
$\tau_{ave}$=48535.033141.

Such arrival times averages were obtained for all the 64 PEG ions.

For all the 64 reference ions standard deviations were calculated as $$\sigma_n = \sqrt{\frac{\sum_{i=1}^{p}(\tau_{ni} - \tau_{ave})^2}{p}} \; ;$$

$\sigma_1$=0.105301186; $\sigma_2$=0.104494391; $\sigma_3$=0.119723646; . . . ; $\sigma_{64}$=0.228691161

(3) the minimum number of instrument responses (ion arrival times, τ, in nanoseconds), $N_i$, to be collected for each reference compound, $n_i$, to achieve a selected confidence level 99.9%, with maximum error δ of 0.1 ns, were calculated as $$N_n \geq \left(\frac{z \times \sigma_n}{\delta}\right)^2$$

and are shown in the Table 1:

TABLE 1

| n | N |
|---|---|
| 1 | 13 |
| 2 | 12 |
| 3 | 16 |
| 4 | 16 |
| 5 | 16 |
| 6 | 16 |
| 7 | 16 |
| 8 | 17 |
| 9 | 18 |
| 10 | 18 |
| 11 | 18 |
| 12 | 18 |
| 13 | 18 |
| 14 | 18 |
| 15 | 18 |
| 16 | 19 |
| 17 | 18 |
| 18 | 19 |
| 19 | 19 |
| 20 | 18 |
| 21 | 19 |
| 22 | 19 |
| 23 | 20 |
| 24 | 20 |
| 25 | 21 |
| 26 | 20 |
| 27 | 21 |
| 28 | 22 |
| 29 | 22 |
| 30 | 22 |
| 31 | 23 |
| 32 | 22 |
| 33 | 22 |
| 34 | 22 |
| 35 | 22 |
| 36 | 23 |
| 37 | 25 |
| 38 | 24 |
| 39 | 24 |
| 40 | 22 |
| 41 | 25 |
| 42 | 25 |
| 43 | 26 |
| 44 | 31 |
| 45 | 27 |
| 46 | 28 |
| 47 | 28 |
| 48 | 31 |
| 49 | 32 |
| 50 | 34 |

TABLE 1-continued

| n | N |
|---|---|
| 51 | 33 |
| 52 | 32 |
| 53 | 33 |
| 54 | 35 |
| 55 | 37 |
| 56 | 38 |
| 57 | 42 |
| 58 | 43 |
| 59 | 42 |
| 60 | 48 |
| 61 | 49 |
| 62 | 48 |
| 63 | 54 |
| 64 | 57 |

(4) As maximum number of all $N_n$ is 57, $N_{max}=N_{64}=57$, at least 57 spectra, which are sets of instrument responses, $\tau$, for each reference ion must be collected, $\tau_1, \tau_2, \ldots, \tau_{57}$, in order to calculate the average arrival times (instrument response), for each reference ion;

(5) Calculate the average arrival time for each reference ion, $n_i$, i=1, ..., 57 (i=1, ..., N) as $$\tau_{n\,ave} = \frac{\sum_{i=1}^{N} \tau_{ni}}{N}$$

(6) using the least square approximation method, coefficients, $A_{initial}$, $B_{initial}$, and $C_{initial}$, were calculated and initial quadratic calibration equation was obtained $A_{initial}$=0.000000323857314

$B_{initial}$=0.000463123673068

$C_{initial}$=5.072697495288030

$m=0.000000323857314\tau^2-0.000463123673068\tau+5.072697495288030$   ($f_{initial}$)

which relates the arrival time of an ion, $\tau$, to its mass, m;

(7) The average arrival times, $\tau_{1\,ave}, \tau_{2\,ave}, \ldots, \tau_{n\,ave}$, determined in step (5), were substituted into the initial quadratic calibration function ($f_{initial}$) obtained in step (6) and calculated masses of the reference ions, $m_{1calc}$, $m_{2calc}$, $m_{3calc}$, ..., $m_{ncalc}$, were obtained.

(8) The mass errors generated by the initial quadratic equation (flaw) for all n reference ions, were calculated as $$\delta_i = \frac{(m_{icalc} - m_{i\,exact})}{m_{i\,exact}} \times 10^6 \; i=1, \ldots, n \; \text{(ppm)}$$

Figure 6:
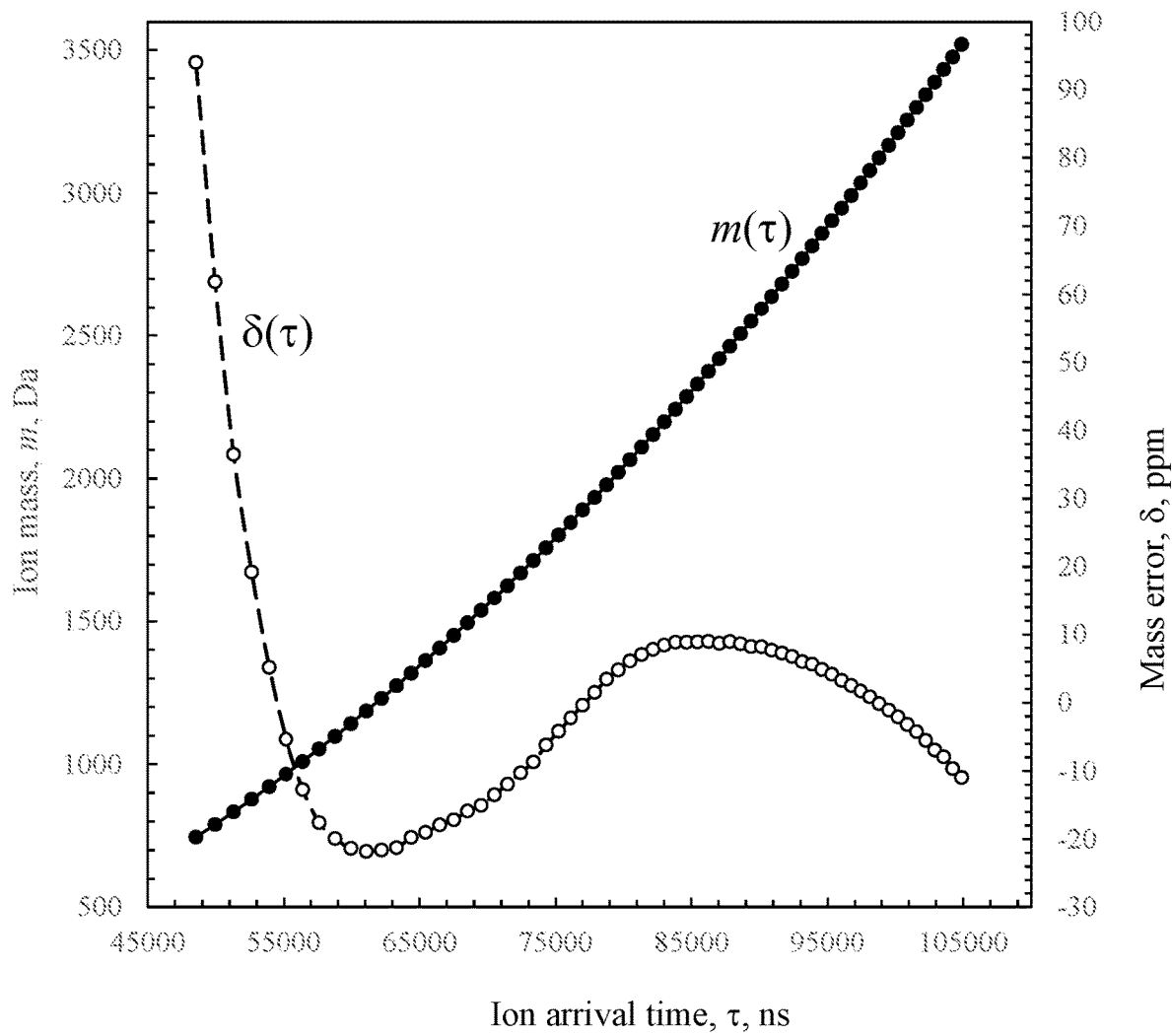
FIG. 6 illustrates an exemplary full range calibration function and mass errors generated by that function.

The calculated masses and mass errors of the reference ions are shown in FIG. 6;

(9) The mass errors, $\delta_i$, of each reference compound is compared to a predetermined maximum acceptable value, $\delta_{max}$, often accepted as 5 ppm, $\delta_{max}$=5 ppm.

(10) If the calculated mass errors for all the reference ions in the full range, in this example from 745 to 3520 m/z, are less than the maximum allowable mass error, $\delta_i < \delta_{max}$, the obtained in step (6) calibration function, $f_{initial}$, is considered as valid and can be used to determine the attributes of unknown samples, the masses of ions. Such valid in the full range initial calibration equation is considered the Initial Full Range Master Calibration Function, $f_{M(f)\,initial}$.

(11) However, as can be seen from FIG. 6, the calculated mass errors, $\delta$, range from −22 to +94 ppm, and for majority reference ions in the mass range from 745 to 3520 m/z significantly exceed the maximum allowable mass error of 5 ppm;

(a) In this case a set of three-point partial range calibration equations, using sets of three closely adjacent reference compounds, was obtained. For example, the equation $f_{(745-921)}$ was approximated from three reference compounds 745, 833, and 921 m/z, and covers range from 745 to 921 m/z, the equation $f_{(921-1098)}$ was approximated from three reference compounds, 921, 1010, and 1098 m/z, and covers range from 921 to 1098 m/z, the equation $f_{(1098-1274)}$ was approximated from three reference compounds 1098, 1186, and 1274 m/z, and covers range from 1098 to 1274 m/z etc., until the three point sets reached the end of the range of interest:

$f_{(745-921)}$: $m=0.000000323006922 \cdot \tau^2 - 0.000363865876187 \cdot \tau + 2.188389167732910$ $f_{(921-1098)}$: $m=0.000000323188280 \cdot \tau^2 - 0.000382259818932 \cdot \tau + 2.652918837008430$ $f_{(1098-1274)}$: $m=0.000000323597917 \cdot \tau^2 - 0.000430295205487 \cdot \tau + 4.061106513613590$ ... (continue till the three point sets reached the end of the range of interest)

Figure 7:
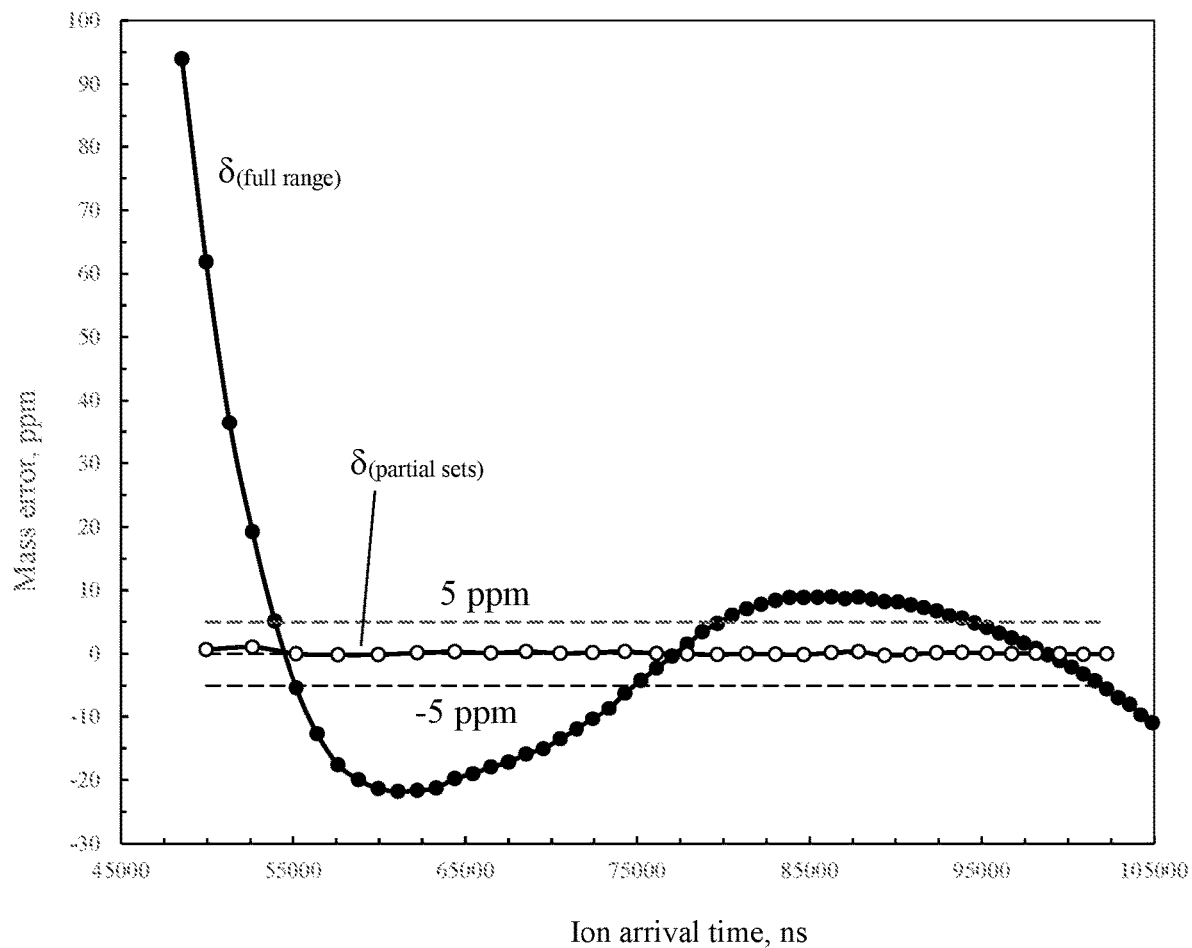
FIG. 7 illustrates the comparison between mass errors generated by a full range calibration function and by a set of partial range calibration functions.

The molar masses of compounds were measured on the instrument utilizing the set of the partial range calibration functions. As shown in FIG. 7 the mass errors generated by the set of partial range calibration functions range from −0.2 to 1 ppm and are much less than mass errors generated by the full range calibration function, and are less than allowed 5 ppm;

(b) In addition, a set of intermediate three-point calibration functions, such as for example function $f_{(833-1010)}$ covering range from the middle of previously obtained $f_{(745-921)}$ to the middle of $f_{(921-1098)}$, also was obtained:

$f_{(833-1010)}$: $m=0.000000323322644 \cdot \tau^2 - 0.000397083823838 \cdot \tau + 3.061584675889090$

....

The averaged overlapped calibration functions also were obtained. For example, the coefficients of the functions $f_{(745-921)}$ and $f_{(833-1010)}$ were averaged to obtain a calibration function $f_{(833-921)}$, to be used for the range in which these two functions overlap, from 833 to 921 m/z.

$$A_{(833-921)} = \frac{A_{(745-921)} + A_{(833-1010)}}{2} =$$
$$\frac{0.000000323006922 + 0.000000323322644}{2} = 0.000000323164783;$$

$$B_{(833-921)} = \frac{B_{(745-921)} + B_{(833-1010)}}{2} =$$
$$\frac{-0.000363865876187 - 0.000397083823838}{2} = -0.0003804748500125$$

$$C_{(833-921)} = \frac{C_{(745-921)} + C_{(833-1010)}}{2} =$$
$$\frac{2.18838916773291 + 3.06158467588909}{2} = 2.624986921811$$

-continued $f_{(833-921)}: m = 0.000000323164783 \cdot \tau^2 - 0.0003804748500125 \cdot \tau + 2.624986921811$ The use of the averaged partially overlapped quadratic calibration functions shown further decrease in generated mass errors. For some ions the mass error was up to 30% less than already small error generated by partial range functions.

(12) For the particular instrument and method parameters used, the full range calibration function obtained in step (10) and sets of partial range calibration functions obtained in (11)(a), (11)(b) reflect the intrinsic instrument response and constitute the master calibration functions, which are stored within the instrument method parameters.

Master Calibration Process (1) A set of calibration reference compounds were run two times and two sets of new instrument response signals were collected;

(2) A quadratic calibration function was used;

(3) Two sets of new constants, $A_{new}$, $B_{new}$, $C_{new}$, for a new calibration equations were obtained;

$f_{(1)new}: A_{(1)new}=3.2336192E-07; B_{(1)new}=-3.995561313134E-04; C_{(1)new}=3.10022E+00;$ $f_{(2)new}: A_{(2)new}=3.2336160E-07; B_{(2)new}=-3.996561313101E-04; C_{(2)new}=3.09250E+00;$ (4) The maximum mass errors generated by the two new calibration equations obtained in (3) were found:

$f_{(1)new}: \delta=18$ ppm>5 ppm $f_{(2)new}: \delta=1.5$ ppm<5 ppm (5) The new calibration function $f_{(1)new}$ generated the maximum mass error of 18 ppm, much higher than the acceptable mass error of 5 ppm, so the function $f_{(1)new}$ is not valid, and cannot be used for analyzes or to update the master function;

The new calibration function $f_{(2)new}$ generated the maximum mass error of 1.5 ppm, which is lower than the selected maximum value. So, function $f_{(2)new}$ is considered to be valid, it can be used for the analysis close in time and its coefficients $A_{(2)new}$, $B_{(2)new}$, $C_{(2)new}$, are averaged with the corresponding coefficients of the initial or previous master calibration function.

Figure 8:
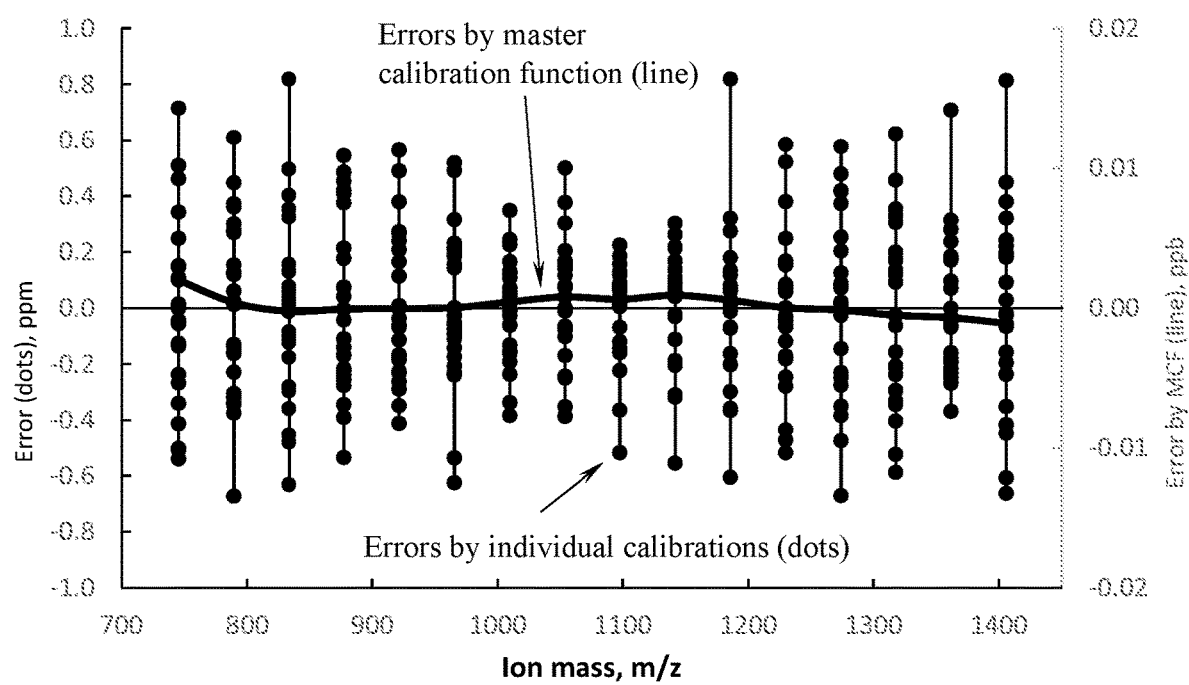
FIG. 8 illustrates the comparison between mass errors generated by individual full range calibration functions and by the Master Calibration Function.

FIG. 8 shows the mass errors generated by individual calibration functions and the Master Calibration Function obtained using the same individual calibrations. As can be seen, while the mass errors from individual functions range from −0.7 to +0.8 ppm (parts per million), the mass errors generated by the Master Calibration Function do not exceed 0.002 ppb (parts per billion) in this particular case.

Many modifications and other examples of the disclosure set forth herein will come to mind to those skilled in the art to which this disclosure pertains, having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims.

Moreover, although the foregoing descriptions and the associated embodiments describe aspects of the disclosure in the context of certain example combinations of structural elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of calibrating an instrument to reduce random errors in determining an attribute of one or more samples, comprising:

(i) running by a user, a set of two or more reference samples on the instrument;

(ii) deriving a set of one or more constants of one or more calibration functions correlating one or more instrument response signals with the attribute of the reference sample;

(iii) repeating steps (i) and (ii) to collect a first plurality sets of the one or more constants until a total number of the first plurality sets equals or exceeds a predetermined number N;

(iv) averaging each of the one or more constants in the first plurality set to obtain a first averaged set for determining the attribute of the reference sample;

(v) repeating steps (i)-(ii), prior to examining a first unknown sample, to obtain a second plurality sets of the one or more constants;

(vi) averaging each of the one or more constants in the second plurality set to obtain a second averaged set;

(vii) determining deviation in the attribute calculated from the second averaged set and from the first averaged set;

(viii) if the deviation is equal or smaller than a predetermined value, averaging the first averaged set and the second averaged set to obtain a first updated set;

and optionally (ix) running by a user, the instrument to obtain instrument response signals of the first unknown sample and determining the attribute of the first unknown sample, wherein the attribute of the unknown sample is determined in reference to the first averaged set, the second averaged set or the first updated set.

2. The method of claim 1, further comprising (x) repeating steps (i)-(ii) to obtain a third plurality sets of the one or more constants of the calibration function;

(xi) averaging the third plurality sets to obtain a third averaged set;

(xii) determining deviation in the attribute calculated from the third averaged set and from its immediately preceding updated set or the first updated set;

(xiii) if the deviation of step (xii) is equal or smaller than the predetermined value, averaging the third averaged set with its immediately preceding updated set or the first updated set to obtain a second updated set, wherein the attribute of a second unknown sample is determined based on the third averaged set, its immediately preceding updated set or the second updated set;

(xiv) optionally obtaining instrument response signals of the second unknown and determining the attribute of the second unknown sample, and optionally repeating (x) to (xiii) prior to examination of a subsequent unknown sample.

3. The method of claim 1, further comprising, when steps (i) and (ii) are repeated after collection of the first plurality sets, removing the set of the one or more constants in step (ii) if its deviation in the attribute is greater than the predetermined value.

4. The method of claim 1, wherein the deviation is based on the maximum difference in the attribute calculated from the first averaged set and the second averaged set.

5. The method of claim 1, wherein the set of samples in step (i) comprises three or more samples.

6. The method of claim 1, wherein each calibration function comprises three or more constants.

7. The method of claim 1, further comprising after step (iv):
determining the error of the attribute calculated from the first averaged set, wherein if the error is bigger than a pre-selected value, then one, two, three or more subsets of the reference samples are selected to derive respectively one, two, three or more sub-sets of constants, wherein the attribute of an unknown sample falling with a respective subset of the reference samples is calculated based on the constants of the respective subset, and wherein the respective subset substitutes the first averaged step for subsequent steps.

8. The method of claim 1, further comprising:
after step (iv), determining the error of the attribute calculated from the first averaged set, wherein if the error is bigger than a pre-selected value, two subsets of the reference samples are selected to derive two subsets of constants, wherein the two subsets have a partial overlap and are averaged to obtain an averaged subset; and wherein the averaged subset substitutes the first averaged step for subsequent steps with regards to an unknown sample falling with the overlap.

9. The method of claim 1, wherein the attribute is mass of the sample.

10. The method of claim 1, wherein the mass correlates with a time response signal of the instruction and the one or more constants of the calibration function.

11. The method of claim 1, wherein the average of one or more calibration constants are in an equation as follows:

$$m_s = A_{ave}\tau_s^2 + B_{ave}\tau_s + C_{ave}$$

where, $\tau_s$ is sample arrival time, $A_{ave}$, $B_{ave}$, and $C_{ave}$, are averaged values of calibration constants from valid calibrations performed during longtime use of the instrument and calculated as is $$A_{ave} = \frac{\sum_{i=1}^{N} A_s}{N}; B_{ave} = \frac{\sum_{i=1}^{N} B_s}{N}; C_{ave} = \frac{\sum_{i=1}^{N} C_s}{N}.$$

12. The method of claim 1, wherein the predetermine number N is calculated based on a pre-selected confidence level z, a pre-selected top limit of deviation or error, and the largest standard deviation among standard deviations for all of the reference samples.

13. The method of claim 12, wherein the predetermine number N is calculated according to the following equation, $$N_n \geq \left(\frac{z \times \sigma}{\delta}\right)^2$$

wherein z is the pre-selected confidence level, σ is the largest standard deviation, and δ is the pre-selected top limit of deviation or error.

14. A system comprising a computer-readable medium coupled to one or more data processing apparatus having instructions stored thereon which, when executed by the one or more data processing apparatus, cause the one or more data processing apparatus to perform a method of claim 1.

15. The system of claim 14, further comprising one or more memories for storing and updating calculation results.

16. A method to detect an attribute of an unknown sample, comprising:
(i) running by a user, a set of reference samples on an instrument;
(ii) deriving a set of one or more constants of one or more calibration functions correlating one or more instrument response signals with the attribute of the reference sample;
(iii) repeating steps (i) and (ii) to collect a first plurality sets of the one or more constants until a total number of the first plurality sets equals or exceeds a predetermined number N;
(iv) averaging the first plurality sets of the one or more constants of the calibration function to obtain a first averaged set for determining the attribute of the reference sample;
(v) repeating steps (i)-(ii), prior to detecting the unknown sample, to obtain a second plurality sets of the one or more constants;
(vi) averaging the second plurality sets to obtain a second averaged set;
(vii) determining deviation of the second averaged set from the first averaged set;
(viii) if the deviation is equal or smaller than a predetermined value, averaging the first averaged set and the second averaged set to obtain a first updated set, running by a user, the instrument to obtain the instrument response signals of the first unknown sample, and determining the attribute of the unknown sample in reference to the first averaged set, the second averaged set or the first updated set.

17. The method of claim 16, further comprising after step (iv):
determining the error of the attribute calculated from the first averaged set, wherein if the error is bigger than a pre-selected value, then one, two, three or more subsets of the reference samples are selected to derive respectively one, two, three or more sub-sets of constants, wherein the attribute of the unknown sample falling with a respective subset of the reference samples is calculated based on the constants of the respective subset, and wherein the respective subset substitutes the first averaged step for subsequent steps.

18. The method of claim 16, further comprising:
after step (iv), determining the error of the attribute calculated from the first averaged set, wherein if the error is bigger than a pre-selected value, two subsets of the reference samples are selected to derive two subsets of constants, wherein the two subsets have a partial overlap and are averaged to obtain an averaged subset; and wherein the averaged subset substitutes the first averaged step for subsequent steps with regards to the unknown sample falling with the overlap.

19. The method of claim 16, wherein the attribute is mass.

20. The method of claim 16, wherein the attribute is determined based on the second averaged set.

* * * * *

UNITED STATES PATENT AND TRADEMARK OFFICE
CERTIFICATE OF CORRECTION

PATENT NO. : 12,141,240 B2
APPLICATION NO. : 17/648505
DATED : November 12, 2024
INVENTOR(S) : Roman Brukh Page 1 of 1

It is certified that error appears in the above-identified patent and that said Letters Patent is hereby corrected as shown below:

In the Claims

At Column 21, Claim number 13, Line number 60, the equation should read:

$$N \geq \left(\frac{z \times \sigma}{\delta}\right)^2$$

Signed and Sealed this
Fourth Day of February, 2025

Coke Morgan Stewart
*Acting Director of the United States Patent and Trademark Office*